US006718097B2

(12) United States Patent
Dyott

(10) Patent No.: US 6,718,097 B2
(45) Date of Patent: Apr. 6, 2004

(54) METHOD OF INCORPORATING OPTICAL MATERIAL INTO AN OPTICAL FIBER

(75) Inventor: Richard B. Dyott, Oaklawn, IL (US)

(73) Assignee: KVH Industries, Inc., Middletown, RI (US)

(*) Notice: Subject to any disclaimer, the term of this patent is extended or adjusted under 35 U.S.C. 154(b) by 29 days.

(21) Appl. No.: 09/903,387

(22) Filed: Jul. 11, 2001

(65) Prior Publication Data

US 2002/0048432 A1 Apr. 25, 2002

Related U.S. Application Data

(60) Provisional application No. 60/219,702, filed on Jul. 18, 2000.

(51) Int. Cl.[7] .............................. G02B 6/26; G02B 6/42; G02B 6/30

(52) U.S. Cl. .............................. 385/49; 385/30; 385/27; 385/39

(58) Field of Search ..................... 385/30, 49

(56) References Cited

U.S. PATENT DOCUMENTS

| 4,630,890 A | | 12/1986 | Ashkin et al. ............. 350/96.3 |
| 4,669,814 A | | 6/1987 | Dyott ....................... 350/96.15 |
| 4,678,334 A | * | 7/1987 | Coate et al. ................ 356/461 |
| 4,695,123 A | * | 9/1987 | Chang et al. .................. 385/11 |
| 4,712,866 A | | 12/1987 | Dyott ........................ 350/96.3 |
| 4,795,233 A | * | 1/1989 | Chang ......................... 385/11 |
| 4,798,438 A | * | 1/1989 | Moore et al. .................. 385/43 |
| 4,815,817 A | | 3/1989 | Levinson ................. 350/96.33 |
| 4,881,791 A | * | 11/1989 | Mallinson et al. ............. 385/37 |
| 4,895,422 A | * | 1/1990 | Rand et al. .................. 385/122 |
| 5,058,980 A | * | 10/1991 | Howerton ..................... 385/31 |
| 5,135,555 A | | 8/1992 | Coyle, Jr. et al. .............. 65/12 |
| 5,566,257 A | | 10/1996 | Jaeger et al. |
| 5,586,205 A | * | 12/1996 | Chen et al. .................... 385/29 |
| 5,710,852 A | * | 1/1998 | Weber ......................... 385/123 |
| 5,768,462 A | | 6/1998 | Monte |
| 5,781,675 A | | 7/1998 | Tseng et al. ................... 385/30 |
| 5,854,864 A | | 12/1998 | Knoesen et al. ............... 385/30 |
| 6,004,315 A | * | 12/1999 | Dumont ....................... 606/15 |
| 6,026,205 A | * | 2/2000 | McCallion et al. ........... 385/30 |

(List continued on next page.)

FOREIGN PATENT DOCUMENTS

| DE | 33 05 104 A1 | 8/1984 |
| DE | 36 15 305 A1 | 11/1987 |
| EP | 0 686 867 A1 | 12/1995 |
| EP | 0 722 081 A2 | 7/1996 |
| EP | 0 872 756 A1 | 10/1998 |

OTHER PUBLICATIONS

McCallion and Shimazu; "Side–Polished Fiber Provides Functionality and Transparency", Laser Focus World, 34 (9): S19–S24, (Sep. 1, 1998).

International Search Report completed on Mar. 8, 2002 and Mailed on Apr. 4, 2002.

Michael Vernon Pack, Thesis: Numerical Analysis of an Electro–Optic Polymer Core Waveguide for High Speed Optical Modulation, Dec. 2001.

Garth Merlin Kraus, Thesis: Polymer Core Replacement of A D–Shaped Fiber, Aug. 2001.

Primary Examiner—John D. Lee
Assistant Examiner—Tina M Lin
(74) Attorney, Agent, or Firm—Foley Hoag, LLP

(57) ABSTRACT

A method for incorporating an optical material into an optical fiber and optical devices utilizing the method are disclosed. Fiber material may be removed from the optical fiber to expose the fiber core and the core may then be at least partially removed. The optical material may then be incorporated into the core area to replace the removed core. Cladding material may then be deposited over the optical material and an electrode may be fixed to the cladding over the optical material to form an optical device.

48 Claims, 3 Drawing Sheets

U.S. PATENT DOCUMENTS

| | | |
|---|---|---|
| 6,041,149 A | 3/2000 | Monte |
| 6,047,095 A | 4/2000 | Knoesen et al. ............... 385/30 |
| 6,075,915 A | 6/2000 | Koops et al. ............... 385/125 |
| 6,091,879 A | 7/2000 | Chan et al. |
| 6,134,356 A | 10/2000 | Monte |
| 6,141,475 A | 10/2000 | Lawrence et al. |
| 6,144,779 A * | 11/2000 | Binkley et al. ................ 385/8 |
| 6,185,033 B1 | 2/2001 | Bosc et al. .................. 359/254 |
| 6,194,120 B1 | 2/2001 | Chan et al. |
| 6,208,456 B1 | 3/2001 | Lawrence |
| 6,236,793 B1 | 5/2001 | Lawrence et al. |
| 6,289,027 B1 | 9/2001 | Lawrence et al. |
| 6,292,282 B1 * | 9/2001 | Mossberg et al. ........... 359/123 |
| 2002/0018636 A1 * | 2/2002 | Bischel et al. .............. 385/140 |

* cited by examiner

METHOD OF INCORPORATING OPTICAL MATERIAL INTO AN OPTICAL FIBER

RELATED APPLICATIONS

This application claims priority to, and incorporates by reference, the entire disclosure of U.S. Provisional Patent Application No. 60/219,702, filed on Jul. 18, 2000.

FIELD OF THE INVENTION

The present invention relates to fiber optic sensors. Specifically, the invention relates to optical devices for use in telecommunications and fiber optic sensors.

BACKGROUND OF THE INVENTION

Optical fibers have been developed having an asymmetric cross-section, as in U.S. Pat. No. 4,669,814 to Dyott. Such fibers may be prepared with one side of the optical fiber located near the optical guiding region. The guiding region of the fiber may have a non-circular cross-section defining two transverse orthogonal axes, which, in combination with the different refraction indices of the core and cladding, may permit the de-coupling of waves polarized along said axes. The non-circular cross-section of the outer surface of the fiber may have a predetermined geometric relationship to the transverse axes of the guiding region, so that the orientation of those axes may also be ascertained from the geometry of the outer surface. Such optical fibers may be geometrically induced birefringent polarization-preserving fibers. Asymmetric fibers with circular cross-section cores may find applications as well, as in U.S. Pat. No. 4,815,817 to Levinson.

Asymmetric fibers may be used in many fiber optic devices, for example, indium-coated polarizers as in U.S. Pat. No. 4,712,866 to Dyott, grating filters as in U.S. Pat. No. 6,075,915 to Koops, et al., and many sensor arrangements. For some of these devices, the asymmetric fiber may be used to permit access to the fields of the optical waveguide. In practice, however, the core-to-surface distance may be large enough to prevent external interaction with the evanescent tails of the optical mode field. In U.S. Pat. Nos. 5,854,864 and 6,047,095, both to Knoesen et al., an asymmetric fiber is polished until only a thin layer of cladding remains covering the core so as to form an evanescent coupling region. In U.S. Pat. No. 6,185,033 to Bosc et al., an electrode is placed adjacent an exposed core of an optical fiber. The devices recited in these patents may provide better access to the fields of the optical waveguide. However, coupling and alignment considerations may remain, as evanescent field interactions are weak and may thus require the interaction length to be long or the amount of control voltage to be high. In devices coupling light out of the core by having an electro-optic material of higher refractive index than the core, the light must be coupled back into the core. This is necessarily wavelength selective, though most devices are desired to be broadband. Further, the refractive index of the electro-optic material is a function of temperature, which function may not normally be the same as that for the core. The performance of such devices may thus be very temperature dependent, requiring such devices to be temperature stabilized. Thus, a method for permitting direct access to the fields of the optical waveguide would find use in a wide variety of fiber optic devices, including those devices mentioned previously as well as other fiber optic applications, such as telecommunications and sensors.

SUMMARY OF THE INVENTION

According to one aspect of the invention, fiber material may be removed from an optical fiber to expose the fiber core and the core may then be at least partially removed. One or more optical materials may then be incorporated into the core area to replace the removed core. As used herein, an optical material may include any of numerous materials that may be optically transmissive of light propagating within the fiber, and/or may have optically useful properties. In one embodiment, the fiber material and core may be removed by etching. In another embodiment, the fiber material may be removed by side polishing and the core removed by etching. In a further embodiment, the fiber material and/or core may be removed by excavation with an eximer laser. Other embodiments may include fiber material and/or core removal by Reactive Ion Etching and other methods as are known in the art.

According to another aspect of the invention, an asymmetric fiber may be etched until one side of the fiber may be near the core. In one embodiment, the fiber is further etched on a selected portion of the side near the core to at least partially remove the core and at least one optical material may then be incorporated into the core area to replace the removed core. In another embodiment, the core may be excavated by an eximer laser to at least partially remove the core.

According to another aspect of the invention, a circular fiber may be side polished until the core may be nearly exposed. In one embodiment, the core may then be at least partially removed by etching the side polished face. In another embodiment, the core may be at least partially removed by excavation with an eximer laser. The removed core material may then be replaced by at least one optical material.

According to another aspect of the invention, material may be removed from an optical fiber to expose the fiber core and the core may then be at least partially removed. In one embodiment of the invention, the removed core material may then be replaced with an electro-optic material. In another embodiment of the present invention, the removed core material may be replaced with a rare-earth doped material. In yet another embodiment of the present invention, the removed core material may be replaced with a thermo-optic material. In a further embodiment of the present invention, the removed core material may be replaced with a combination of optical materials.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

Figure 1:
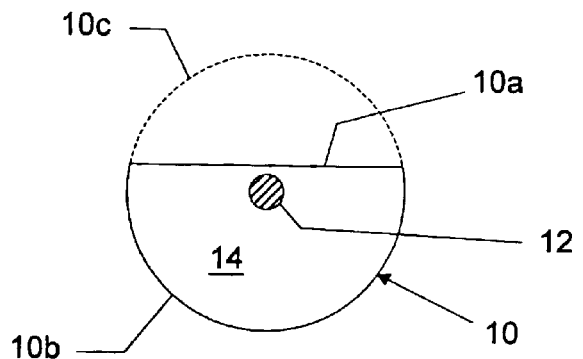
FIG. 1 is a transverse cross-sectional view of an optical fiber having an asymmetric configuration.

Referring now to FIG. 1, an optical fiber 10 is shown in transverse cross-section. Fiber 10 may be comprised of a fiber core 12 and a cladding 14. Core 12 may be circular or may be another suitable shape to support desired modes within fiber 10. Fiber 10 is seen to be an asymmetrical fiber 10, i.e., the location of fiber core 12 may be substantially asymmetric with respect to a center of the cladding 14, with core 12 closer to one surface portion 10a of cladding 14 than to a remaining surface portion 10b of cladding 14. In one embodiment, illustrated in FIG. 1, fiber 10 may be fabricated as a D-shaped fiber. In another embodiment, fiber 10 may be fabricated as a circular fiber with a portion, indicated by dotted line 10c in FIG. 1, having been removed to form an asymmetric fiber 10 such as illustrative D-shaped fiber 10.

Figure 2:
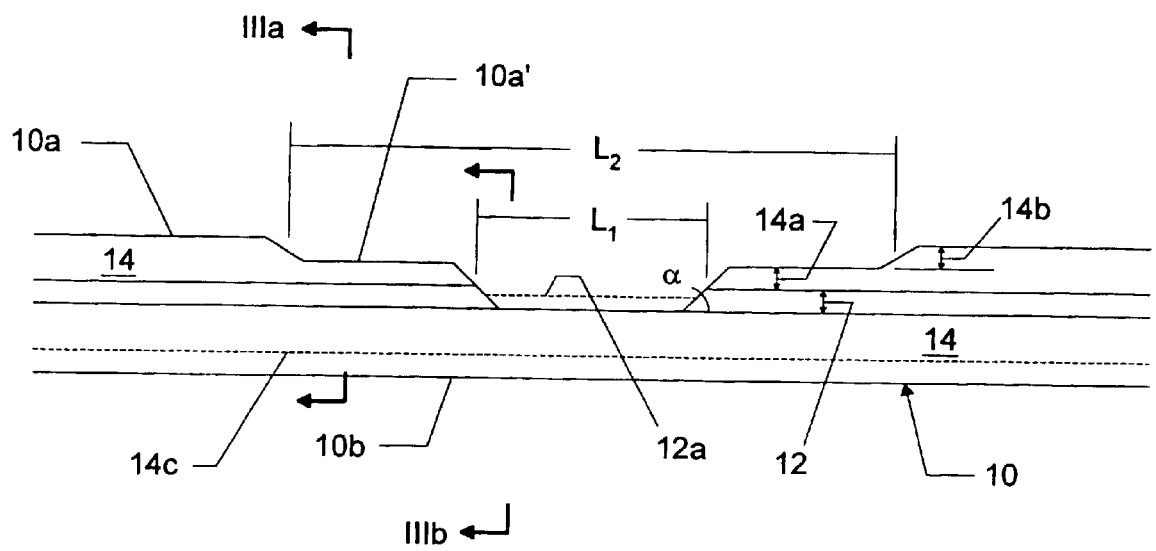
FIG. 2 is a longitudinal cross-sectional view of the fiber of FIG. 1 after at least a portion of the core has been removed.

Referring now to FIG. 2, the asymmetrical fiber 10 of FIG. 1 is shown in longitudinal cross-section after at least a portion of core 12 has been removed with surface portion 10a having a generally flat surface and surface portion 10b having a generally rounded shape. In the embodiment of FIG. 2, a length $L_1$ of core 12 may have been completely removed. In another embodiment, core 12 may have been partially removed such that a portion of core 12 remains, as indicated by dashed line 12a. Further, a portion of cladding 14 may have also been removed. In one embodiment, cladding 14 may have been removed in at least two steps. In a first step, a length $L_2$ of cladding 14 may be removed such that only a thin layer 14a of cladding 14 covers core 12, though layer 14a may not be so thin as to permit significant evanescent mode interaction. In a second step, length $L_1$ of both cladding layer 14a and core 12 may be removed. Removal of cladding 14 and core 12 may be accomplished by etching in, for example in one embodiment, hydrofluoric acid. In the first step of one embodiment utilizing etching, fiber 10 may first be exposed to the etching agent along length $L_2$ so as to remove layer 14b covering core 12. Fiber 10 may be completely exposed to the etching agent along length $L_2$ such that a portion of cladding 14 may be removed from all surfaces of fiber 10, as indicated by dashed line 14c.

Alternatively, only surface portion 10a may first be exposed to the etching agent, leaving remaining surface portion 10b substantially intact. Next, etched surface 10a' of fiber 10 may be exposed to the etching agent along length $L_1$ so as to etch away, or remove both layer 14a of cladding 14 and at least a portion of core 12. In one embodiment of the present invention, core 12 may be fabricated of germanium-doped silica, whereas cladding 14 may be fabricated of silica glass. Germanium may be typically incorporated in the core 12 to provide a higher index of refraction required for wave-guiding. As is known in the art, the etching rate of germanium-doped silica is much greater than that of pure silica so that exposure of length $L_1$ to an etching agent may proceed to remove thin layer 14a until core 12 may be reached. At this point, etching of core 12 may proceed at a much faster rate than etching of cladding 14 surrounding core 12, thus removing at least part of the core, while cladding 14 adjacent core 12 may remain. In one alternative embodiment, etching to remove cladding, thin layer 14a and core 12 may proceed in a single step. In another alternative embodiment of the invention, cladding 14 may be removed down to layer 14a by side polishing the length $L_2$ of fiber 10. Further embodiments may include removing cladding 14, layer 14a, core 12, or combinations thereof by excavation with a laser, such as an eximer laser, by Reactive Ion Etching (RIE), or by other means as may be known by those skilled in the art.

Figure 3A:
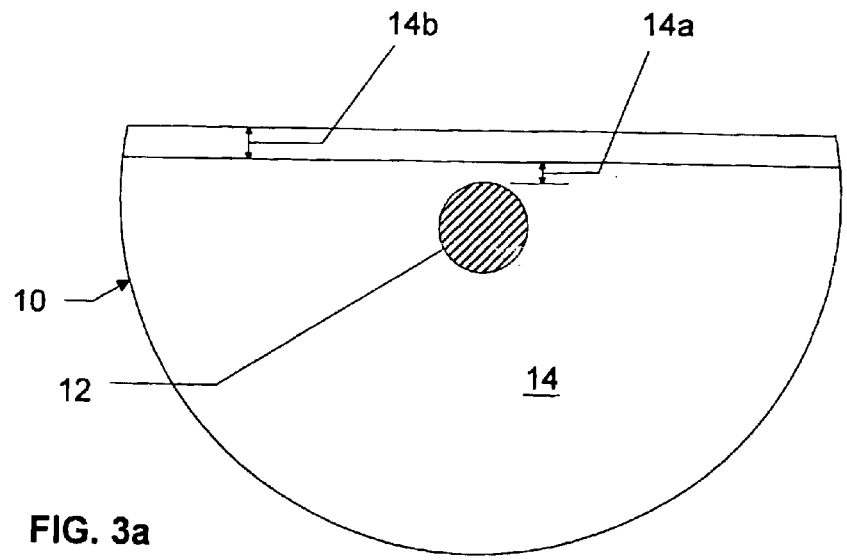
FIG. 3a is a transverse cross-sectional view of one embodiment of the fiber of FIG. 2 taken at IIIa—IIIa of FIG. 2.
Figure 3B:
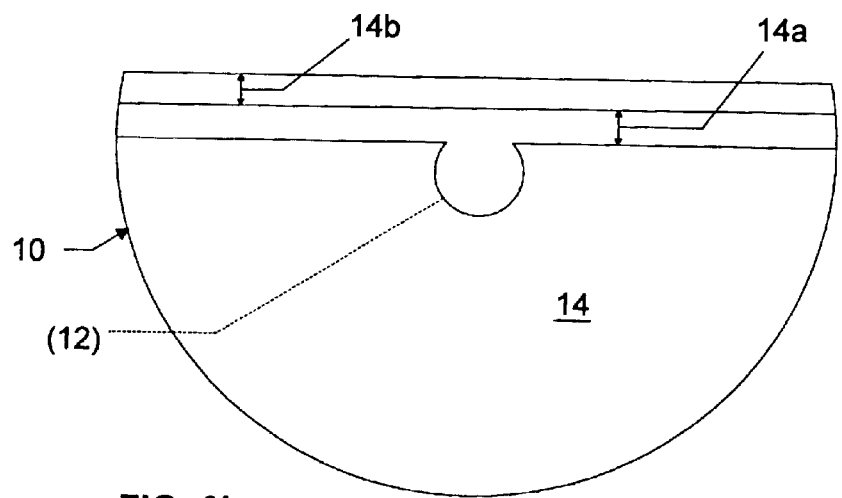
FIG. 3b is a transverse cross-sectional view of one embodiment of the fiber of FIG. 2 taken at IIIb—IIIb of FIG. 2.
Figure 3C:
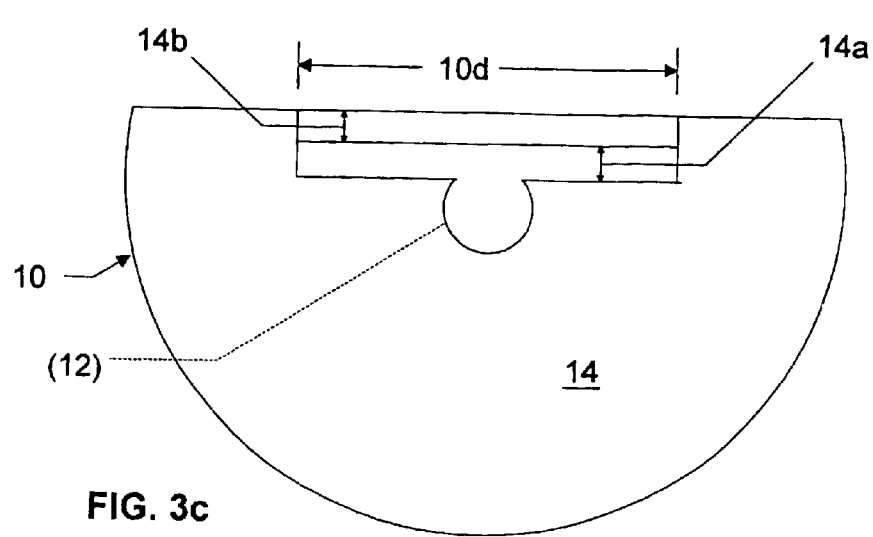
FIG. 3c is a transverse cross-sectional view of another embodiment of the fiber of FIG. 2, corresponding to the view of FIG. 3b.

Referring now to FIGS. 3a through 3c, partial transverse cross-sectional views of the resultant shape of asymmetric fiber 10 after removal of cladding 14 and core 12 are illustrated. In the embodiment of FIGS. 3a through 3c, removal of cladding 14 and core 12 may have proceeded in accordance with the two step etching process previously described, though other removal processes described herein or known in the art may yield similar shapes. FIG. 3a is taken along line IIIa—IIIa of FIG. 2 and may correspond with completion of the first etching step. A portion 14b of cladding 14 may have been removed, leaving thin layer 14a over core 12. FIG. 3b is taken along line IIIb—IIIb of FIG. 2 and may correspond with completion of the second etching step. In the embodiment of FIG. 3b, thin layer 14a and core 12 may have been removed. In one embodiment, as shown in the transverse cross-sectional view of FIG. 3c and corresponding to the cross-sectional location of FIG. 3b, only a central longitudinal portion 10d of fiber 10 may have been exposed to the etching agent, such that cladding 14 not within central longitudinal portion 10d may not have been removed.

Figure 4:
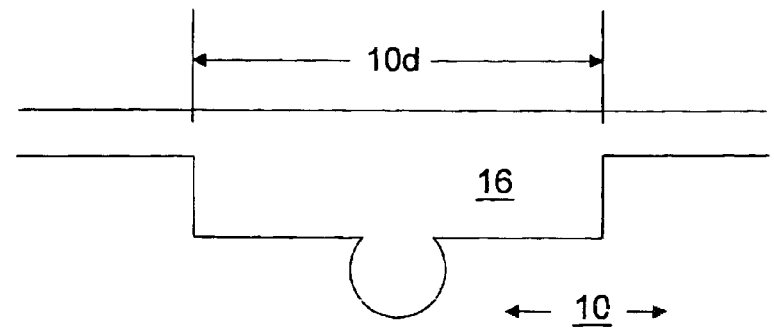
FIG. 4 is a partial transverse cross-sectional view of the fiber of FIG. 2, with a layer of optical material laid over its flat face.

Upon completion of the removal process, fiber 10 may be held firmly in place, as by a fixture, a clamp, embedment in a matrix, or other such holding means as may be known in the art, and an optical material may be deposited over fiber 10 in the area generally corresponding to the removed cladding and core. Referring now to FIG. 4, there is shown a partial transverse cross-sectional view of the asymmetric fiber 10, corresponding to FIG. 3c, with optical material 16 applied thereto. As noted previously, optical material 16 may include materials that may be transmissive of light propagating through fiber 10 and/or materials that may have optically useful properties. It is further noted that more than one optical material 16 may be deposited, either in horizontal layers, generally corresponding to line 12a of FIG. 2, or in longitudinal layers along length $L_1$ of FIG. 2. In one embodiment, optical material 16 may be a doped polymer or electro-optic polymer and may be spin coated onto fiber 10. In other embodiments, optical material 16 may be a thermo-optic material, a rare-earth doped material, a material having a high verdet constant, a material having amplification properties, i.e., material that may act as an amplifying medium, or other material as may be required for desired applications as may become evident to those skilled in the art.

Figure 5:
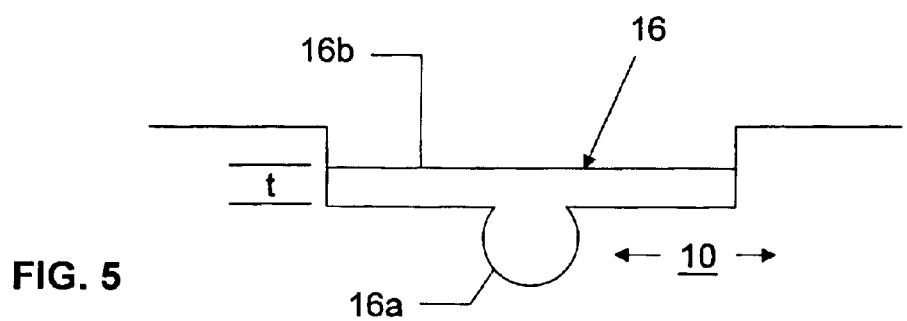
FIG. 5 is a partial transverse cross-sectional view of the fiber of FIG. 4, with excess optical material removed.

As seen in FIG. 4, optical material 16 may have been deposited beyond central portion 10d. In one embodiment of the present invention, it may be necessary to remove excess optical material 16 that may have been deposited outside central portion 10d such that light within fiber 10 may not escape from the desired waveguide region, i.e., from the central region 10d. In this and other embodiments, excess optical material 16 may be removed by means known to those skilled in the art, such as plasma etch or RIE, with the resultant shape as shown in FIG. 5. It is noted that, for the embodiment of FIG. 3b, the optical material may still only be required to be deposited over central portion 10d of fiber 10. In one embodiment having a cross-section as shown in FIG. 3b, optical material 16 may be deposited over the full surface portion 10a of fiber 10. In another embodiment having a cross-section as shown in FIG. 3b, surface portion 10a may be masked to expose only an area corresponding to central portion 10d of FIG. 3c, and optical material 16 may be deposited over the masked area and the central area 10d. In either embodiment, excess optical material 16 will be removed as described previously, such that a shape as shown in FIG. 5 may remain.

As shown in FIG. 5, optical material 16 may include a core portion 16a, corresponding to core 12, and a layer portion 16b, corresponding to thin layer 14a. In one embodiment, layer portion 16b may be constrained to a thickness "t" sufficiently small in optical wavelengths so as not to provide a light path. Referring again to FIG. 2, coupling between core 12 of fiber 10 and optical material 16, may be facilitated by tapering the transition between core 12 and optical material 16, as indicated by angle α in FIG. 2. Such a taper may ensure efficient transfer of guided waves from fiber 10 to optical material 16 and back again, without the need for additional fiber splices.

Figure 6:
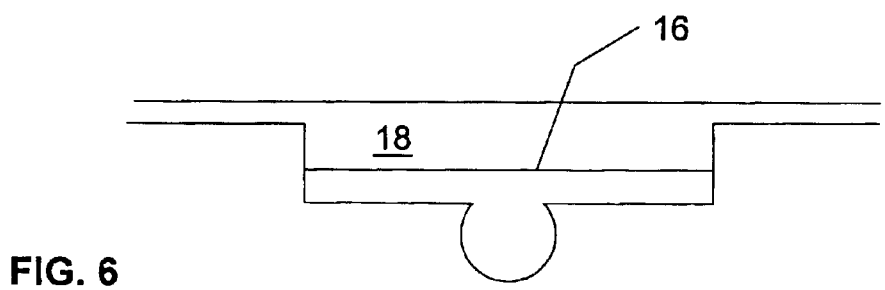
FIG. 6 is a partial transverse cross-sectional view of the fiber of FIG. 5, with a cladding layer.

In at least one application utilizing the present invention, optical material 16 may need to be poled, i.e., it may be necessary to cause dipole moments within material 16 to become aligned, as is well known in the art. However, the poling process may result in microscopic damage to material 16, which may result in optical losses beyond that desired. Thus, in one embodiment of the invention shown in FIG. 6, a protective layer 18 may be applied to fiber 10 prior to poling. In addition to protecting optical material 16 during poling and serving as a cladding, layer 18 may have a lower refractive index than optical material 16 so as to prevent optical losses.

Figure 7:
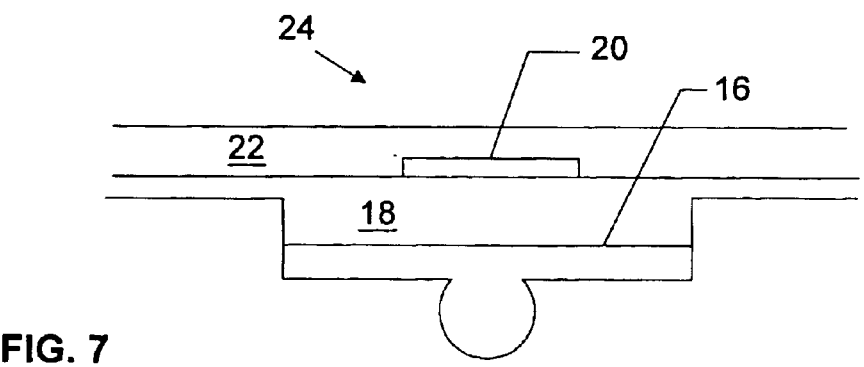
FIG. 7 is a partial transverse cross-sectional view of the fiber of FIG. 6, with an electrode and protective coating attached.

FIG. 7 illustrates a further embodiment of the invention having an electrode 20 affixed to protective layer 18 generally opposite optical material 16. Exterior protective coating 22 may then be applied over protective coating 18 and electrode 20 so as to provide additional protection to a device 24 formed by optical material 16 and electrode 20. Depending on the composition of optical material 16, the poling of material 16, the placement of electrode 20 and other treatments as may be desired and readily evident to those skilled in the art, the device 24 may be configured as a phase modulator using electro-optic material, an optical amplifier or source using rare-earth doped material, or a tunable filter by superimposing a diffraction grating in the material. In further embodiments of the device 24, device 24 may be a switchable directional coupler by adjoining two fibers 10, or material 16 may have a high verdet constant such that device 24 may be an optical in-fiber isolator when used with a periodic magnetic field with pitch related to the beat length. Further, electrode 20 may include arrays of electrodes, spanning longitudinally, transversely, or in both directions along fiber 10.

While the invention has been disclosed in connection with the preferred embodiments shown and described in detail, various modifications and improvements thereon will become readily apparent to those skilled in the art. As an example, core 12 of fiber 10 may be removed and replaced with optical materials at a series of discrete areas along the length of fiber 10. The length $L_1$ may be varied such that the areas of replaced core along the length may resemble a series of dots (shorter $L_1$), a series of dashes (longer $L_1$), or combinations of both. The embodiments as described herein, and as may become apparent to those skilled in the art, may permit direct access to the fields of the optical waveguide, thus allowing for shorter interaction lengths or lower control voltage than prior art devices using evanescent field interactions. Further, devices utilizing the present invention may not be wavelength selective or temperature dependent to the extent that such prior art devices are. Accordingly, the spirit and scope of the present invention is to be limited only by the following claims.

What is claimed is:

1. A method for incorporating at least one optical material into a core of an optical fiber, comprising:
    (a) removing at least a section of a cladding of the fiber to expose the core;
    (b) removing at least a portion of the core;
    (c) at least partially replacing the removed portion of the core with the at least one optical material, wherein said at least one optical material is selected from the group consisting of: an electro-optic polymer, a thermo-optic material, a rare-earth doped material, a material with a high verdet constant, and a material with amplification properties.

2. The method of claim 1, wherein removing the cladding further comprises at least one of etching and side polishing the cladding.

3. The method of claim 2, wherein removing the core further comprises at least one of etching and excavating the core.

4. The method of claim 1, wherein removing the core further comprises at least one of etching and excavating the core.

5. The method of claim 1, wherein the fiber is asymmetric and removing the cladding further comprises at least one of etching and side polishing a face of the asymmetric fiber nearest the core.

6. The method of claim 5, wherein removing the core further comprises at least one of etching and excavating the core.

7. The method of claim 5, further comprising:
    (a) masking the face of the asymmetric fiber nearest the core so as to leave exposed a longitudinal region centered about and immediately adjacent a projected location of the core onto the face nearest the core; and
    (b) etching within the longitudinal region to remove the cladding.

8. The method of claim 1, wherein the fiber is asymmetric and removing the cladding further comprises etching a full circumference of the fiber.

9. The method of claim 8, wherein removing the core further comprises at least one of etching and excavating the core.

10. The method of claim 1, wherein the fiber is generally circular and removing the cladding further comprises at least one of etching and side polishing the fiber to obtain an asymmetrical fiber.

11. The method of claim 10, wherein removing the core further comprises at least one of etching and excavating the core.

12. The method of claim 1, wherein replacing the removed portion of the core further comprises:
    (a) depositing the at least one optical material on the fiber so as to replace the removed portion of the core and the removed portion of the cladding; and
    (b) removing excess optical material from the at least one optical material replacing the cladding to prevent light within the fiber from escaping from the fiber.

13. The method of claim 12, wherein removing excess optical material further comprises removing the at least one optical material replacing the cladding to a thickness sufficiently small in optical wavelengths to prevent light of a wavelength corresponding to that of the light within the fiber from propagating in the at least one optical material replacing the cladding.

14. The method of claim 12, wherein depositing the at least one optical material further comprises masking a portion of the fiber so that the at least one optical material replacing the cladding is confined to a longitudinal region centered about and immediately adjacent the at least one optical material replacing the core.

15. The method of claim 14, wherein removing excess optical material further comprises removing the at least one optical material replacing the cladding to a thickness sufficiently small in optical wavelengths to prevent light of a wavelength corresponding to that of the light within the fiber from propagating in the at least one optical material replacing the cladding.

16. The method of claim 1, wherein following replacing the removed portion of the core, the method further comprises covering the at least one optical material with a protective coating.

17. The method of claim 16, further comprising:
   (a) affixing an activation means to the protective coating in an opposed relationship to the replaced portion of the core, the activation means for altering optical properties of the at least one optical material; and
   (b) covering the activation means and protective coating with a second protective coating.

18. The method of claim 17, wherein affixing the activation means further comprises affixing an electrode.

19. The method of claim 1, wherein removing at least a portion of the core further comprises forming, in an attitude inclined to a transverse plane of the fiber, a boundary between the core and the at least one optical material replacing the core.

20. A method for incorporating at least one optical material into a core of an optical fiber, comprising:
   (a) removing at least a section of a cladding of the fiber to expose the core;
   (b) removing at least a portion of the core;
   (c) at least partially replacing the removed portion of the core with the at least one optical material, wherein removing the cladding further comprises:
      removing a first section of the cladding along a first longitudinal length of the optical fiber so as to maintain a layer of cladding adjacent the core, the layer adjacent the core inhibiting evanescent mode interaction; and
      removing the layer of cladding adjacent the core along a second longitudinal length of the optical fiber, the second length being shorter than and within the first longitudinal length.

21. The method of claim 20, wherein replacing the removed portion of the core further comprises:
   (a) depositing the at least one optical material along the second length of the fiber so as to replace the removed portion of the core and the removed layer of cladding adjacent the core; and
   (b) removing excess optical material from the at least one optical material replacing the layer of cladding to prevent light within the fiber from escaping from the fiber.

22. The method of claim 21, wherein removing excess optical material further comprises removing the at least one optical material replacing the layer of cladding to a thickness sufficiently small in optical wavelengths to prevent light of a wavelength corresponding to that of the light within the fiber from propagating in the at least one optical material replacing the layer of cladding.

23. The method of claim 22, wherein following replacing the removed portion of the core, the method further comprises covering the at least one optical material with a protective coating.

24. The method of claim 23, further comprising:
   (a) affixing an activation means to the protective coating in an opposed relationship to the replaced portion of the core, the activation means for altering optical properties of the at least one optical material; and
   (b) covering the activation means and protective coating with a second protective coating.

25. The method of claim 24, wherein the at least one optical material is chosen from at least one of an electro-optic polymer, a thermo-optic material, a rare-earth doped material, a material having a high verdet constant and a material having amplification properties.

26. The method of claim 24, wherein affixing the activation means further comprises affixing an electrode.

27. The method of claim 23, wherein the at least one optical material is chosen from at least one of an electro-optic polymer, a thermo-optic material, a rare-earth doped material, a material having a high verdet constant and a material having amplification properties.

28. The method of claim 23, wherein the at least one optical material is poled following covering the at least one optical material with a protective coating.

29. The method of claim 28, wherein the at least one optical material is chosen from at least one of an electro-optic polymer, a thermo-optic material, a rare-earth doped material, a material having a high verdet constant and a material having amplification properties.

30. The method of claim 30, wherein removing at least a portion of the core further comprises forming, in an attitude inclined to a transverse plane of the fiber, a boundary between the core and the at least one optical material replacing the core.

31. The method of claim 30, further comprising:
   (a) masking the fiber so as to leave exposed a first region centered about and immediately adjacent a projected location of the core on an outer surface of the fiber, a length of the exposed region corresponding to the first length;
   (b) etching within the first region to remove the first section of cladding;
   (c) masking the layer of cladding so as to leave exposed a length of the layer of cladding corresponding to the second length; and
   (d) etching within the exposed layer of cladding to remove the layer of cladding.

32. A method of incorporating an optical device into an asymmetric optical fiber, comprising:
   (a) etching the cladding on a face of the optical fiber nearest a core of the fiber along a first length of the fiber to a depth so as to maintain a layer of cladding above the core, a thickness of the layer of cladding being a minimum to inhibit evanescent mode interaction;
   (b) etching the layer of cladding and a portion of the core of the optical fiber along a second length shorter than the first length and located generally in a central region of the first length;
   (c) adding at least one optical material to replace the etched portion of the core and at least a partial depth of the etched layer of cladding; and (d) covering the at least one optical material with a protective coating.

33. The method of claim 32, further comprising affixing an activation means to the protective coating in a location above the at least one optical material in the etched core, the activation means for altering optical properties of the at least one optical material.

34. The method of claim 33, wherein affixing the activation means further comprises affixing an electrode.

35. The method of claim 33, further comprising providing a second protective coating over the activation means.

36. The method of claim 32, wherein adding the at least one optical material further comprises:

(a) adding the at least one optical material to replace a full depth of the layer of cladding; and (b) removing an excess depth of the at least one optical material replacing the layer of cladding so as to maintain the partial depth of the at least one optical material replacing the layer of cladding at a thickness sufficiently small in optical wavelengths to prevent light of a wavelength corresponding to that of the light within the fiber from propagating in the at least one optical material replacing the layer of cladding.

37. The method of claim 32, further comprising poling the at least one optical material after the at least one optical material is covered with a protective coating.

38. A device for use in fiber optic applications, comprising:

(a) an asymmetric optical fiber having a portion of cladding removed to expose a section of a core of the fiber and further having at least a portion of the exposed core removed; and (b) at least one optical material disposed so as to replace the removed portion of the core; wherein said at least one optical material is selected from the group consisting of: an electro-optic polymer, a thermo-optic material, a rare-earth doped material, a material with a high verdet constant, and a material with amplification properties.

39. The device of claim 38, further comprising an activation means for altering optical properties of the at least one optical material so as to affect light propagating through the core of the asymmetric fiber.

40. The device of claim 39, wherein the activation means further comprises an electrode.

41. The device of claim 39, wherein the at least one optical material-comprises an electro-optic polymer and the device is a phase modulator.

42. The device of claim 39, wherein the asymmetric fiber is joined with a second asymmetric fiber having a second core of optical material, and the device is a switchable directional coupler.

43. The device of claim 39, further comprising a first protective layer disposed between the activation means and the at least one optical material.

44. The device of claim 43, wherein the activation means further comprises an electrode.

45. The device of claim 44, further comprising a second protective layer disposed over the electrode.

46. The device of claim 38, wherein the at least one optical material is a rare-earth doped material and the device is one of an optical amplifier and a source.

47. The device of claim 38, wherein a diffraction grating is superimposed in the at least one optical material and the device is a tunable filter.

48. The device of claim 38, wherein the at least one optical material has a high verdet constant and the device is an in-fiber isolator.

* * * * *